Patented Feb. 11, 1947

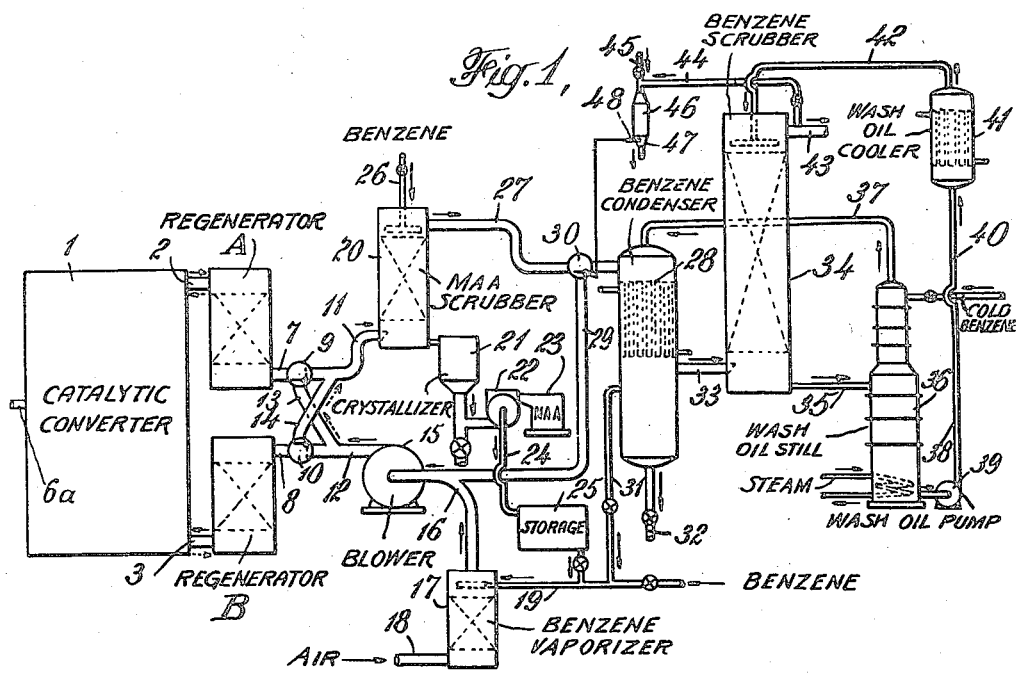
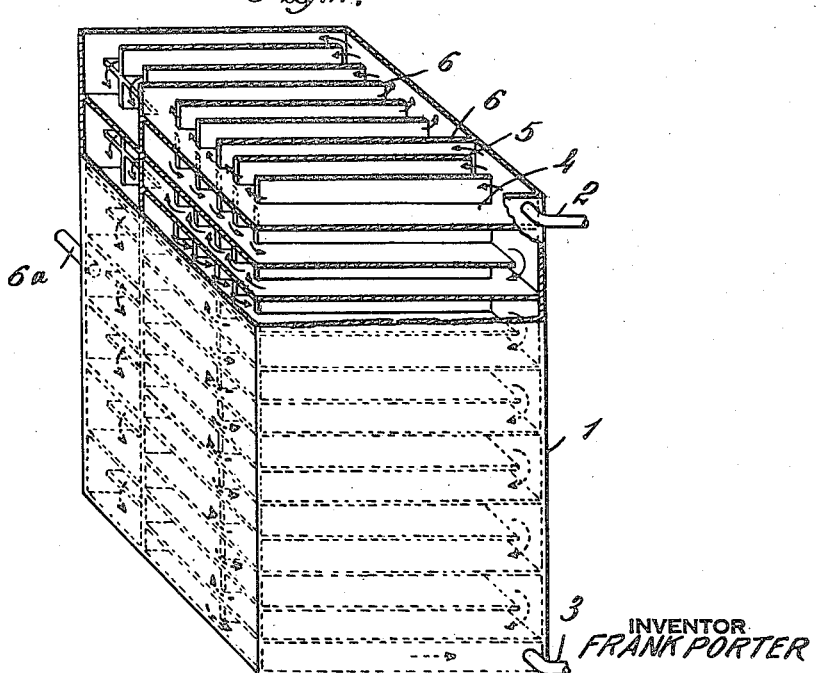

2,415,531

UNITED STATES PATENT OFFICE 2,415,531

MANUFACTURE OF DICARBOXYLIC ACID ANHYDRIDES

Frank Porter, Syracuse, N. Y., assignor to The Solvay Process Company, New York, N. Y., a corporation of New York Application February 6, 1942, Serial No. 429,738

14 Claims. (Cl. 260—342)

This invention relates to the manufacture of dicarboxylic acid anhydrides, referred to hereinafter as dicarboxylic anhydrides, by vapor phase catalytic oxidation of hydrocarbons and oxidized hydrocarbons of a lower degree of oxidation than the dicarboxylic anhydrides.

It is known that dicarboxylic anhydrides may be prepared by catalytic vapor phase air oxidation of numerous hydrocarbons and lower oxidation products. For example, maleic anhydride has been prepared by such oxidation processes from benzene, toluene, xylene, diphenyl, fluorene, acenaphthene, anthracene, butene, butadiene, butane, beta amylene, isoamylene, hexane, heptane, octane, decane, cyclo-pentadiene, cyclohexane, gasoline, and lower oxidation products such as phenol, cresols, benzophenone, benzoquinone, butanol, furane, and furfural; and phthalic anhydride or mixtures of phthalic anhydride and maleic anhydride have been produced from naphthalene, methyl naphthalene, diphenyl, kerosene, spindle oil, decahydronaphthalene, and naphthoquinone.

In the past most commercial operations for the production of maleic and phthalic anhydrides by catalytic vapor phase oxidation have involved as initial materials benzene and naphthalene, respectively. From the first commercialization of this oxidation method the control of reaction temperatures in commercial scale operations has been looked upon as one of the outstanding difficulties in the way of efficient operation. Thus Weiss and Downs, comparing the oxidation of benzene with the known oxidation of ammonia and sulfur dioxide, in the Journal of Industrial and Engineering Chemistry of March 1920, stated: "We inevitably found that even the refined apparatus developed for the control of these older reactions was unsuitable for such a 'hair trigger' reaction as that of benzene to maleic acid."

Various proposals have been made purposing to facilitate heat removal from the reaction zone. Thus it has been proposed to arrange the catalyst within tubes surrounded by a molten metal to conduct away the heat of reaction from the reaction tubes. A successful commercial process has involved catalyst distributed in tubes immersed in a bath of mercury boiling at elevated pressure to remove the heat of reaction in the form of latent heat of vaporization of mercury. Other methods of temperature control have involved circulation of molten salt around catalyst tubes and provision of thimble tubes or bayonet tubes wherein the catalyst is placed in heat exchange relation with a high velocity flow of a cool gas to effect rapid extraction of heat. Further expedients have involved the provision of catalyst supports of high thermal conductivity to convey the heat of reaction away from the catalyst and transfer it to tube walls.

In view of the exigent demand for extremely rapid heat transfer to a suitable cooling fluid, the reaction has been conducted for the most part in tubes of very small diameter, and to provide the necessary volume of catalyst for large scale commercial operations, individual multitubular converters have been constructed containing on the order of one thousand of these tubes. In order to provide gas tight and liquid tight joints and thus prevent escape of reaction mixture or cooling fluid from such apparatus, its construction requires a tremendous amount of highly skillful welding.

In United States Patent 2,071,361 of February 23, 1937, there is described a process for the manufacture of phthalic anhydride by employing a high ratio of oxidizing gas to hydrocarbon so that the heat of reaction may be absorbed as sensible heat of the reaction gas mixture and thus the necessity for immediate heat transfer to an independent cooling fluid may be eliminated. The process is effective for accomplishing its purpose but is subject to the disadvantage that it requires substantially higher than ordinary ratios of air to hydrocarbon and consequently involves substantially increased power demands. In addition to this disadvantage the large excess of air tends to carry away as vapor significant quantities of the desired reaction product unless special means are employed to avoid this difficulty. While the difficulty may be overcome to a considerable degree by the employment of moderately elevated pressures, this expedient has the disadvantage of increasing power requirements for compression.

The process of the present invention effects control of the catalytic vapor phase oxidation of hydrocarbons and their lower oxidation products without the use of any extraneous cooling medium for cooling the reaction zone and without the use of the high air ratios employed in the aforementioned adiabatic process. Thus in the manufacture of phthalic anhydride from naphthalene, the process requires less than half the amount of air or other gas required for the adiabatic process. In the manufacture of maleic anhydride it is possible to employ ratios of air to benzene far lower than commonly employed in commercial operations. The exceedingly low proportions of air employed facilitate the recovery of reaction products, particularly maleic anhydride, and reduce the effluent gas scrubbing problem and the potential nuisance of escaping anhydride.

In accordance with the present invention dicarboxylic anhydrides are manufactured by a vapor phase catalytic oxidation of hydrocarbons and lower oxidation products thereof by molecular oxygen in catalytic oxidation masses containing dicarboxylic-anhydride-forming oxidation catalysts, which masses require no heat removal by thermal conduction, heat being removed in the process by introducing the mixture into the mass at a temperature substantially below oxidation temperature and periodically reversing the flow of the oxidation mixture through the catalyst mass so that hot zones with which the mixture initially contacts are cooled in supplying heat to the mixture and the heat of reaction is dissipated within the catalyst zone by raising the temperature of the catalyst mass. By this procedure the upstream portion of the catalyst mass serves primarily as a heater for raising the temperature of the reaction mixture to oxidation temperature and the central and downstream portions of the catalyst mass serve as a reaction and heat extracting medium. Upon reversal of flow that portion of the catalyst mass which formerly served as a heater for raising the temperature of the mixture to oxidation temperature, now serves as a reaction and heat extracting medium and that portion of the mass which formerly served as the reaction medium now serves as a heater for the mixture.

By the process of my invention practically all of the heat, except the minor proportion lost by incidental radiation, leaves the reaction mass as sensible heat of the reacted mixture. The process differs from adiabatic operations, however, since in adiabatic operations all of the reaction exotherm is present as sensible heat of the reacted gases above the initial reaction temperature whereas in the present process the reaction exotherm is not present as sensible heat measured entirely above the temperature at which the reaction is initiated but is included as sensible heat of the mixture below, as well as above, the initial reaction temperature. Since the oxidation reactions in question do not proceed at appreciable rates until temperatures of about 350° to 400° C. are attained and since the reaction mixture of oxidizing gas and vapor to be oxidized may be prepared at temperatures below 100° C., the process permits utilization of the mixture over a range from below 100° C. to above 350° or 400° C. as a heat extracting medium and thus, as compared with strictly adiabatic operations, cuts in half the volume of mixture necessary to carry away the heat of reaction at a given temperature.

As compared with processes relying upon removal of heat from the reaction zone by thermal conduction, the present process results in a tremendous simplification of structure. The reactor may comprise merely a large chamber packed with catalytic material, preferably of relatively high heat capacity. It is not necessary to employ tubes nor is it necessary to take any special precautions to avoid leakage of gas from one portion of the chamber to other portions thereof. The problem of finding a suitable cooling medium for use at the high temperatures of the reaction is completely avoided. The capital expense involved in the use of mercury and the danger of escape of poisonous mercury vapor is done away with. The corrosion and maintenance problems involved in the use of salt-cooled converters likewise are eliminated.

The process is applicable to the production of dicarboxylic anhydrides from hydrocarbons and lower oxidation products thereof in general. The hydrocarbons and lower oxidation products containing from 4 carbon atoms up to 9 carbon atoms inclusive are more particularly adapted for the manufacture of maleic anhydride whereas those hydrocarbons containing from 10 to 15 carbon atoms are more particularly adapted for the manufacture of phthalic anhydride. By "lower oxidation products" as used herein I mean products formed by the addition of oxygen to hydrocarbons or substitution of oxygen for hydrogen in hydrocarbons.

The amount of heat generated by the oxidation of individual hydrocarbons varies, depending upon the quantity of carbon dioxide or carbon monoxide and water which must be produced for the conversion of a molecule of the hydrocarbon to a molecule of maleic anhydride or phthalic anhydride. Consequently this factor should be taken into consideration in designing equipment for the treatment of any particular hydrocarbon. In general the aliphatic hydrocarbons release more heat than the aromatic hydrocarbons because the efficiency of conversion is lower and correspondingly larger proportions are converted to carbon dioxide and water.

In the case of lower oxidation products, the heat generated is of course less than in the case of the corresponding hydrocarbons, but in this case too there is substantial variation among individual members of the group.

Because of the high yields obtainable with benzene and naphthalene and the low cost of these materials, they are the preferred initial materials for the preparation of maleic anhydride and phthalic anhydride, respectively.

In the manufacture of phthalic anhydride by the process of the invention, it is preferred to mix the hydrocarbon to be oxidized with an oxygen-containing gas to provide a mixture containing between 7 and 30 mol percent of oxygen and between 0.4 and 1 mol percent of the hydrocarbon in the form of vapor and to pass this mixture through a catalytic conversion zone having a maximum temperature lying between 400° and 600° C.

In the manufacture of maleic anhydride, it is preferred to prepare a mixture comprising between 7 and 30 mol percent of oxygen and between 10 and 90 mol percent of the hydrocarbon and to pass this mixture through a conversion catalyst in which the maximum temperature is between 400° and 600° C.

It will be observed that the proportion of hydrocarbon vapor in the mixtures preferably employed for the manufacture of phthalic anhydride is approximately double the proportion employed for the adiabatic conversion. As a consequence of this reduction in the proportion of inert gases present in the mixture, substantially lower power requirements result and the scrubbing of reaction gases to remove noxious vapors before disposing of them to the atmosphere is greatly simplified.

The above advantages are present to a still greater degree in the preferred process for the manufacture of maleic anhydride. In the preferred maleic anhydride process the efficiency of oxygen utilization is between 2 and 3 times as high as in the ordinary processes of present practice and accordingly the volume of oxygen-containing gas required is only one-third to one-half those normally employed. In the preferred process the high heat capacity of the hydrocarbon vapor oxidizing gas mixture also aids temperature control.

Because of its availability, air is a highly satisfactory oxygen-containing gas to employ in the process and its oxygen content need not be altered. Nevertheless the process is satisfactory for employment with other mixtures of oxygen with inert gases or vapors such as steam or carbon dioxide. It is feasible for example to recirculate a portion of the tail gas after removal of all or a portion of the dicarboxylic anhydride therefrom and thus to reduce the concentration of oxygen entering the converter. Preferably, however, the oxygen concentration of the mixture introduced into the converter is at least 7% by volume. It is also possible to increase the oxygen content by introducing oxygen into the entering air or by recycling a portion of the tail gas and mixing the recycled gas with oxygen rather than air.

It is advisable to control the space velocity of the reaction mixture through the catalytic converter to provide in the exhausted tail gas an oxygen concentration of at least 4% $O_2$ by volume, and preferably not more than 10%, and one feature of my preferred process is the provision of an oxygen analyzer to maintain a substantially constant oxygen concentration within these limits in the exhausted tail gas.

The process of the present invention may be carried out in any suitable type of catalyst mass, such as the catalyst masses known to be suitable for use in externally cooled tubular converters.

Thus the process has been conducted satisfactorily for the production of maleic anhydride employing an 8 to 10 mesh Alundum-supported vanadium oxide molybdenum oxide catalyst comprising about 11% $V_2O_5$, about 4% $MoO_3$, and about 0.033% $P_2O_5$. However, such a catalyst is subject to several disadvantages. If it is packed into a chamber having a relatively large cross-sectional area compared to its length, it is difficult to obtain uniform flow of gas through all parts of the mass and consequently irregularities in temperature and reaction rate occur locally. Moreover the thermal capacity of such a mass is somewhat limited and consequently the operating cycle must comprise periods of relatively short duration.

More effective control of the process and consequently a greater efficiency of operation are obtainable in a converter unit especially designed for the type of process in question. It is desirable to provide a higher ratio of thermal capacity to active catalyst surface than provided by the usual mass. This ratio obviously may be increased by employing carrier fragments of larger dimensions. In order to eliminate transverse temperature differentials, it is desirable that the ratio of the length of the reactor to its cross-sectional area should be high. While this factor alone will eliminate in large measure the reduced efficiency caused by local divergence of temperature from the transverse mean temperature, it does not eliminate such temperature divergence. Substantial transverse temperature differences are reflected in reduced converter output capacity. Consequently to provide the most efficient process and the most effective use of catalyst, the converter should be designed so as to provide uniformity of temperatures across the converter. Where the cross sectional area is large in proportion to the fragment size, an increase in the ratio of length to cross-sectional area to a point such that the transverse temperature gradient is an isotherm results in an undesirably high back pressure upon the system. These considerations make it desirable to employ in place of a single, long, packed chamber of small cross-section a series of groups of parallel passages of relatively short length compared with the total length of the series and separated from adjacent groups by mixing zones. The catalyst may be distributed in the passages, or the passage walls may be coated with the catalyst, or both. While the packed passage arrangement is especially suitable for use with catalysts of relatively low activity, it is preferred to employ a highly active catalyst and correspondingly reduced surface rather than to employ a large surface of relatively inactive catalyst.

Regardless of the thermal capacity of the catalyst mass, it is desirable to control the length of reaction periods so that the heat evolved during each period does not exceed about 20 times the thermal capacity of the catalyst mass, expressed as the number of calories required to raise the temperature of the catalyst mass one centigrade degree. In other words, neglecting the absorption of heat by the gases, the heat of reaction during any one period should not be more than theoretically necessary to raise the average temperature of the catalyst mass 20° C. During practical operations the average temperature of the catalyst mass remains approximately constant but local temperatures fluctuate and in each period the temperature of the downstream portion of the mass rises gradually and the temperature of the upstream portion of the mass gradually falls.

A substantial contribution to ease of temperature control may be provided by employing a pair of non-catalytic heat regenerators, one at each end of the converter so that the reaction mixture passes first through one regenerator, then through the converter, and finally through the other regenerator, and upon reversal of flow, passes through the three units in inverse order and in an opposite direction. The regenerators automatically accomplish the function of supplying to the converter a reaction mixture of gradually diminishing temperature as the maximum temperature in the converter increases during each period, thus overcoming a tendency toward higher maximum temperatures and higher reaction rates that would otherwise develop in the reactor. An additional controlling factor is that the point of maximum temperature moves in the direction of gas flow to relatively cooler masses in the reactor. The result of these factors is that the point of maximum temperature moves back and forth as the gas flow is reversed and the maximum temperature does not fluctuate widely. While the tendency toward increase of reaction rate may be overcome by providing an acceleration of flow as each period proceeds, this expedient places a variable burden upon the supply and recovery systems and it is preferred to normalize the conditions in the converter by provision of the aforementioned regenerator units. In place of the non-catalytic regenerator units, other means for supplying the reaction mixture at gradually lower temperatures during each period, for example tubular heat exchangers, may be provided but the desired function is not inherent in such devices and hence they require special control mechanisms.

In the attached drawing,

Fig. 1 shows diagrammatically an arrangement of equipment suitable for carrying out the preferred process for the manufacture of maleic anhydride from benzene; and Fig. 2 shows one type of internal structure for a converter suitable for use in the arrangement of Fig. 1.

With especial reference to Fig. 2 of the drawing, a catalytic converter 1 having gas inlet-outlet conduits 2 and 3 is provided for conducting the oxidation.

In the view shown in Fig. 2, the exterior walls of the converter have been removed from the first few tiers to show the internal construction more clearly. Thus, it may be seen that the first tier into which conduit 2 leads comprises a partition 4 common to the first and second tiers, and a plurality of parallel, short cross-partitions 5 and long cross-partitions 6. Each pair of partitions 5 is separated from the next pair by one of the long partitions 6 and each of the long partitions 6 is staggered with respect to the next. This arrangement provides for three parallel streams of gas toward the left in front of the near partition 6, toward the right between it and the far partition 6, and toward the left again behind the far partition 6. At each change of direction the three separate streams are mixed with one another. On the far side of the far partition 6 partition 4 is cut away at the left side to permit passage of gas into the second tier of the converter. In the second tier there are cross-partitions identical with partitions 5 and 6 so that a series of three groups of three parallel passages is provided in this tier. The partition between the second and third tiers is cut away at the right forward end to permit communication between these tiers. The third tier is just like the first tier and the fourth just like the second and so on. A gas inlet 6a may be provided near the center.

While the converter is capable of many variations in design, the important features are the provision of inert material of ample thermal capacity disposed to provide a series of individual passages or a series of groups of parallel passages each relatively long compared with one cross-sectional dimension and relatively short compared with the total length of the series, and a plurality of mixing zones for intermingling the gases from various parts of the individual passage, or from the various passages of a group, between each passage or group and the next in series.

The converter may be constructed of firebrick or Alundum tile or of other suitable materials. The walls 4 may be constructed of one material and the walls 5 and 6 of different materials. Thus, walls 4 may be made of Alundum tile and walls 5 and 6 of split firebrick. The high conductivity of the Alundum tile improves the heat distribution in the unit. The walls are preferably between 1 and 2½ inches thick and the passages may have one cross-sectional dimension between ¼ inch and 2 inches and a second cross-sectional dimension 4½ inches, 9 inches or more and the length may be from 1 to 10 or more feet between mixing zones. The entire unit may be enclosed in a sheet-metal case to render it gas tight.

It will be apparent from the above description of the reactor unit that this unit may comprise merely a steel shell lined with firebrick, the interior of which is composed entirely of a catalyst supporting material and consequently a major proportion of the cost of the reactor is eliminated. In place of a catalyst chamber entirely loaded with catalyst supporting material a chamber containing alternate layers of catalytic material of low heat capacity and non-catalytic material of high heat capacity may be used.

The internal construction of regenerators A and B may be similar to the construction of converter 1 except for the catalytic coating, which is not employed in these regenerators. It is preferred to employ as regenerators firebrick-lined chambers randomly packed with broken firebrick, for example 1 to 2 inch lump fragments, providing a tortuous flow through a mass of heat cumulative material in each regenerator. Such regenerators are less expensive to construct than regenerators patterned after converter 1.

Regenerators A and B are connected by conduits 7 and 8 with three-way valves or dampers 9 and 10 which are connected to conduits 11 and 12 and cross-conduits 13 and 14 as shown. Conduit 12 connects with a blower 15 for forcing reaction mixture through the system. The inlet side of blower 15 is connected by conduit 16 with a benzene vaporizer 17 having an air inlet 18 and benzene inlet 19. Vaporizer 17 may be a small packed tower with means for spraying benzene onto the packing which it contains. Any other conventional form of vaporizer may be employed, however.

Conduit 11 leads to the bottom of a maleic anhydride scrubber 20 which also may be a packed tower. A liquid outlet leads from the bottom of scrubber 20 to a cooler and crystallizer 21. Crystallizer 21 is connected with a filter 22 which ejects solids to the storage vessel 23 and liquid via pipe 24 to a storage tank 25. At the top of the scrubber 20 an inlet 26 for benzene scrubbing liquid is provided and an outlet conduit 27 leads to benzene condenser 28. From conduit 27 a recycling conduit 29 leads to the low pressure side of blower 15. Distribution of gas between condenser 28 and blower 15 may be regulated by a damper 30. The benzene condenser 28 may be constructed of acid-resistant material, such as a chromium nickel molybdenum steel, to avoid corrosion by acidic condensate recovered in this unit. In place of a tubular cooler, a direct contact cooler may be employed using benzene or aqueous liquid as the cooling agent which may be circulated through an external cooler. A small amount of alkaline reagent such as sodium carbonate may be added to neutralize acids present and thus avoid the requirement for acid-resistant material.

Condenser 28 is provided with outlet pipe 31 for benzene and outlet pipe 32 for aqueous condensate. Conduit 33 leads from condenser 28 to benzene scrubber 34 which may be similar in construction to the maleic anhydride scrubber 20. A liquid outlet pipe 35 leads from the bottom of scrubber 34 to a still 36 off from whose top vapor conduit 37 leads to condenser 28 or to any suitable condenser. From the bottom of still 36, a pipe 38 leads to pump 39 which is connected by pipe-line 40 with a heat exchanger 41. Pipe-line 42 leads from heat exchanger 41 to the top of scrubber 34. Gas outlet conduit 43 is provided at the top of scrubber 34 for exhausting gases and may lead to a suitable stack. Preferably branch conduit 44 leads from conduit 43 to the inlet conduit 45 of a small converter 46 having an outlet 47 within which is disposed a thermostat 48 controlling damper 30.

Ordinary steel may be employed for constructing the various metal parts of the system illustrated and of course such conventional engineering details as heat insulation, temperature measuring devices, and control equipment are applicable although they have not been illustrated.

The walls of the converter should be coated with an active oxidation catalyst. The catalytic coating may be provided in situ by flooding the converter with a solution of catalytic material, draining the solution from the converter, and drying the wet walls to remove water. By employing a saturated solution and repeatedly flooding and drying the converter, a catalytic coating can be built up to any desired thickness, for instance about 0.4 pound catalytic oxide per 100 pounds of carrier. The solution may comprise ammonium vanadate, vanadyl chloride, or vanadyl chloride molybdenyl chloride mixtures in proper proportions. After the coating has been applied and built up to the desired thickness, it may be roasted to convert the ammonium vanadate or vanadyl chloride or other material to the catalytically active form in customary manner.

Instead of flooding the converter to coat the walls thereof, a gaseous mixture containing the vanadium or vanadium molybdenum solution as a mist may be passed through the converter unit. By introducing the mist alternately at opposite ends of the converter, a coating may be built up that is relatively heavy at the ends and relatively light in the central portion of the catalyst mass, thus providing the highest catalyst activity where it is most needed. The refractory material may be heated before introducing the mist, thus causing the water to evaporate immediately and the soluble compounds to decompose promptly, or the mist may be passed through the cold converter and the converter may then be heated to evaporate water and decompose the soluble compounds. The initial hot treatment has the advantage that it is unnecessary to cool down the converter before applying the catalyst and the catalyst coating may be built up to the desired thickness in a single application with reversing flow.

After the catalyst has been suitably prepared, the catalytic converter 1 may be heated by passage of hot combustion gas therethrough until a maximum temperature of about 480° C. is reached. The hot combustion gas may be introduced through conduit 6a centrally disposed with respect to the converter and may be exhausted first through regenerator A and then through regenerator B so as to heat up these units to the desired operating temperature. In the regenerators the temperature gradients will fall from a temperature near the minimum temperature in the catalyst chamber at the ends in communication therewith to about 100° C. or 150° C. at the far ends. One end of the converter and the proximate regenerator are heated to substantially higher temperatures than the others.

Warm air, which may have been previously dried, and benzene are introduced through conduits 18 and 19 at rates adjusted to provide a benzene air mixture at about 70° C. containing a mol ratio of 50 mol percent air and 50 mol percent benzene vapor. This mixture passes into regenerator B (assuming this is the regenerator heated to the higher temperature) where it is heated to about 340° C. and enters the hot end of the converter at about this temperature. In the converter the temperature rises to 480° C. and heat of reaction is absorbed in the form of sensible heat of the catalyst mass. Now, however, the reaction mixture comes in contact with a catalyst mass at progressively lower temperatures in its further passage through the converter until as it leaves the converter it has been cooled to a temperature in the neighborhood of 460° C. The mixture then passes through regenerator A where it is cooled to about 350° C.

During the process the temperature of the heat cumulative material in regenerator B gradually falls and consequently the temperature of the mixture of benzene and air leaving this regenerator falls as the period continues. In the converter the zone of maximum temperature is gradually shifted down-stream and at the same time the maximum temperature of the refractory mass therein rises.

When the temperature of the mixture entering the converter has fallen to about 100° C., for instance after about two minutes, during which the reaction may have generated about 5 times the heat capacity of the reactor, the mixture leaving the converter may be at a temperature around 480° C. The dampers 9 and 10 may now be shifted to reverse the direction of flow of the gaseous mixture through the regenerators and the converter so that the mixture now enters regenerator A, wherein it is heated by the hot refractory material to say 340° C. and then enters the catalytic converter 1, this end of the converter being for the moment the hot end. The mixture passes through the converter and may leave it at a temperature of about 460° C. passing to regenerator B at this temperature. In the regenerator B the mixture is cooled by contact with refractory material to a temperature around 350° C. at which the mixture passes to the scrubber 20.

The temperature of the mixture entering scrubber 20 may vary from 350° C. to 360° C. or thereabouts as the reaction proceeds, dropping to the lower temperature at the beginning of each new reaction period. The rate of flow of air benzene vapor mixture is controlled in relation to the temperatures in the converter so as to consume between 3½% and 5% of the benzene and between 50% and 80% of the oxygen. The appropriate rates for this purpose may be determined readily by analysis of the exit gases. The reaction mixture is cooled in scrubber 20 to about 60° to 70° C. by direct contact with benzene introduced as a spray at the top of the scrubber. This temperature is preferably maintained in order to avoid condensation of water in this scrubber and thereby permit the recovery of maleic anhydride substantially free from water and maleic acid. The flow of benzene to the maleic anhydride scrubber 20 may be thermostatically controlled to maintain constant temperature in the vapor mixture leaving this unit.

Benzene scrubbing liquid passes from scrubber 20 to crystallizer 21 where it is cooled to a temperature of about 3° C. to crystallize out maleic anhydride. The anhydride separates as crystals of about 99½% purity. These crystals are separated from the benzene in filter 22 and may be washed with benzene and distilled to yield a maleic anhydride of good quality. The benzene mother liquor contains about 15% by weight of maleic anhydride and about 10% of benzoquinone. This solution is passed to storage tank 25.

Gases and vapors from the maleic anhydride scrubber 20 pass into benzene condenser 28 where they are cooled to condense benzene. Water condensed in this unit settles and may be withdrawn through pipe 32. Benzene condensate may be recirculated to the benzene vaporizer or passed to storage for other uses.

Gases from which benzene has been condensed but which yet contain some benzene vapor are passed into scrubber 34 wherein they are scrubbed countercurrently with wash oil to remove remnants of benzene. The wash-oil employed may be a high-boiling petroleum oil such as that employed in the scrubbing of coal distillation gases, for instance a saturated aliphatic hydrocarbon oil boiling between 250° and 300° C.

The wash-oil benzene solution collected at the bottom of scrubber 34 passes into still 36 in which benzene is distilled off from the wash-oil. The benzene vapor may be condensed in condenser 28 or the still 36 may be equipped with a separate condenser. Reflux liquid to the still 36 may be supplied from condenser 28 or from suitable benzene storage. The flow of reflux liquid to still 36 may be thermostatically controlled by the temperature of the vapors leaving this unit. Similarly the steam input into the bottom of this still may be suitably controlled by the temperature of oil leaving the still. The wash-oil from which benzene has been removed is pumped by pump 39 through the cooler 41 and then returned to the top of scrubber 34 where it is sprayed into the gases or onto the packing in this scrubber.

The benzoquinone, maleic anhydride, benzene mixture collected in storage tank 25 may be recirculated continuously or intermittently to the converter. The simplest method of disposing of this liquor comprises passing it together with fresh benzene to the converter. However, it may be collected separately until a considerable supply has been collected and then passed separately to the converter, or it may be distilled to remove benzene and the resulting benzoquinone maleic anhydride mixture may be fed to the converter. In view of the lower exotherm of the benzoquinone oxidation, the temperature of the mixture entering the maleic anhydride scrubber will be substantially lower during this conversion and as a consequence the concentration of maleic anhydride in the liquor passing through crystallizer 21 will be higher. This ratio is further increased by the absence of benzene from the reaction mixture. Accordingly, to avoid stoppage of the filter, extra benzene may be supplied to the filter or crystallizer during this operation to make up for the smaller quantities introduced from scrubber 20, or the maleic anhydride product may be withdrawn partly or entirely from the bottom of the crystallizer.

If desired, a portion of the reaction gases from the process may be recirculated by proper adjustment of damper 30 to permit a portion of gas vapor mixture leaving scrubber 20 to return via conduit 29 to blower 15. Such a by-pass provides ready means for moderating the reaction taking place in converter 1 or for lowering the temperature in the converter if for some reason it should become excessive.

By the above outlined process yields of maleic anhydride between 60% and 70% of theoretical are readily obtainable.

The appropriate reaction temperatures in converter 1 may be maintained automatically by withdrawing a small proportion of the tail gas through line 44, mixing it with a fixed proportion of benzene introduced at 45 and passing the mixture through a small converter 46 having at its outlet end a thermostat 48 connected to damper 30 (or the valve on line 19). Such a thermostat has been found to reflect with a high degree of accuracy the proportion of oxygen in the tail gas. By adjusting the thermostat to open damper 30 (or the valve on line 19) so as to recycle a small proportion of tail gas benzene vapor mixture (or increase the feed of benzene) whenever the oxygen concentration of the tail gas leaving scrubber 34 drops more than ½% below the optimum, say below 6%, and to return the damper (or valve) to closed or at least less widely open position when the oxygen content of the tail gas has been returned to say 7%, the reaction rate in converter 1 may be controlled and the converter temperature regulated.

A more responsive control may be obtained by providing auxiliary gas inlets (not shown) near the high temperature zone of the converter, for instance at the fourth or fifth tier from the upstream end or even at the middle tier, and injecting relatively cool air benzene vapor mixture or benzene alone as liquid or vapor directly into the converter at this point. By placing such inlets under the control of the aforementioned thermostat so that whenever the oxygen content of the tail gas drops to 6%, about 3% to 5% of the ingoing mixture will be by-passed around the preheating regenerator and the up-stream end of the converter until the oxygen content of the tail gas returns to 7%, excellent control of the process is obtained entirely automatically.

Automatic control may be dispensed with in a properly balanced system and the thermostat may merely be connected to an alarm or a recorder or both so that the operator can periodically check the oxygen content of the tail gas and, if desirable, manually adjust the ratio of air to benzene or the proportion of recirculated tail gas or the proportion of by-pass gas to compensate for any trend of the reaction away from optimum conditions. It is possible for the operator by such manual adjustments to maintain the oxygen concentration constantly within the optimum ±1% with only the usual routine checks of instruments and infrequent manual adjustments.

The term "oxidation temperature" as used in the following claims designates a temperature at which a substantial proportion of the heat of oxidation is generated. For ordinary operations the oxidation temperature may be considered as a temperature within 25 degrees of the maximum temperature since only a relatively small proportion of the oxidation proceeds at lower temperatures. It is unnecessary for all of the conversion mass to be at oxidation temperatures and in normal operations only a portion of the mass will be at such temperatures; hence in the claims references to a conversion mass containing catalyst at oxidation temperatures are not to be construed as limiting the claims to operations in which the entire conversion mass is at such temperatures but is intended to include operations in which only a portion of the catalyst contained in the conversion mass is at such temperatures.

I claim:

1. In the manufacture of a dicarboxylic anhydride by the vapor phase catalytic oxidation of hydrocarbons and lower oxidation products thereof, the improvement which comprises passing a reaction mixture of vapor of the compound to be oxidized and an oxygen-containing gas into contact with a hot dicarboxylic-anhydride-forming oxidation catalyst while the mixture is at a temperature low enough to reduce the temperature of the catalyst in this zone and then into contact with additional catalyst which catalyst is at a lower temperature than the mixture contacting therewith to absorb heat from the mixture in a second zone, and periodically reversing the direction of flow of the reaction mixture in contact with the catalyst so as to raise the temperature of the catalyst in the first-mentioned zone and lower the temperature of the catalyst in the second zone.

2. In the manufacture of a dicarboxylic anhydride by the vapor phase catalytic oxidation of hydrocarbons and lower oxidation products thereof, the improvement which comprises passing a mixture of vapor of the compound to be oxidized and an oxygen-containing gas at a temperature below oxidation temperature in contact with a mass of solid containing a dicarboxylic-anhydride-forming oxidation catalytic material at oxidation temperature, whereby the compound is oxidized and heat generated by the oxidation is accumulated as sensible heat by said mass, and periodically reversing the flow of said mixture, whereby the accumulated heat of reaction in the portions of said mass heated by said oxidation is transferred to entering mixture below oxidation temperature thus lowering the temperature of said portions of the mass.

3. In the manufacture of maleic anhydride by vapor phase catalytic oxidation of hydrocarbons containing less than 10 but not less than 4 carbon atoms per molecule and lower oxidation products thereof in contact with a mass of solid which contains material active to catalyze said oxidation and which is not adapted for removal of the heat of reaction from the oxidation zone by thermal conduction, the improvement which comprises passing a mixture of vapor of the compound to be oxidized and an oxygen-containing gas at a temperature substantially below oxidation temperature in contact with said mass at an oxidation temperature between 400° and 600° C. whereupon the compound is oxidized and heat generated by the oxidation is accumulated as sensible heat by said mass, and periodically reversing the flow of said mixture whereby the accumulated heat of reaction in the portions of said mass heated by said oxidation is transferred to mixture below oxidation temperature thus lowering the temperature of said portions of the mass and raising the temperature of the mixture to the oxidation temperature.

4. In the manufacture of phthalic anhydride by vapor phase catalytic oxidation of hydrocarbons containing at least 10 but less than 15 carbon atoms per molecule and lower oxidation products thereof in contact with a mass of solid which contains material active to catalyze said oxidation and which is not adapted for removal of the heat of reaction from the oxidation zone by thermal conduction, the improvement which comprises passing a mixture of vapor of the compound to be oxidized and an oxygen-containing gas at a temperature substantially below oxidation temperature in contact with said mass at an oxidation temperature between 400° and 600° C. whereupon the compound is oxidized and heat generated by the oxidation is accumulated as sensible heat by said mass, and periodically reversing the flow of said mixture whereby the accumulated heat of reaction in the portions of said mass heated by said oxidation is transferred to mixture below oxidation temperature thus lowering the temperature of said portions of the mass and raising the temperature of the mixture to the oxidation temperature.

5. In the manufacture of a dicarboxylic acid anhydride by vapor phase catalytic oxidation of hydrocarbons and lower oxidation products thereof, the improvement which comprises passing a mixture of organic compound to be oxidized and oxygen-containing gas at a temperature below oxidation temperature into a catalytic zone containing a mass of heat cumulative material containing dicarboxylic anhydride-forming oxidation catalyst at oxidation temperature in which catalytic zone the compound is oxidized and heat generated by the oxidation is accumulated as sensible heat by said mass, periodically reversing the direction of flow of said mixture through said mass whereby the accumulated heat of reaction in the portions of said mass heated by said oxidation is transferred to the mixture below oxidation temperature and supplies to it heat necessary to raise its temperature to the oxidation temperature, and during each period preheating the mixture of compound and oxygen-containing gas to a final preheat temperature which is below oxidation temperature and which gradually diminishes during each period.

6. The method of making maleic anhydride by vapor phase oxidation of a hydrocarbon containing less than 10 but not less than 4 carbon atoms per molecule, which comprises passing a mixture comprising between 10 and 90 mol percent of said hydrocarbon vapor and between 7 and 30 mol percent of oxygen at a temperature below oxidation temperature through a catalytic zone in a mass of solid material comprising a maleic-anhydride-forming oxidation catalyst at an oxidation temperature between 400° C. and 600° C. whereupon a portion of the hydrocarbon is oxidized to maleic anhydride and heat generated by the oxidation is accumulated as sensible heat by said mass, and periodically reversing the flow of said mixture, whereby the accumulated heat of reaction in the portions of said mass heated by said oxidation is transferred to mixture below oxidation temperature thus lowering the temperature of the mass and raising the temperature of said portions of the mixture to the oxidation temperature, and limiting the length of each period so that the total heat evolved therein is not more than 20 times the thermal capacity of the catalyst zone expressed as calories per degree C.

7. The method of making phthalic anhydride by vapor phase oxidation of a hydrocarbon containing at least 10 but less than 15 carbon atoms per molecule, which comprises passing a mixture comprising between 0.4 and 1 mol percent of said hydrocarbon vapor and between 7 and 30 mol percent of oxygen at a temperature below oxidation temperature through a catalytic zone in a mass of solid material comprising a phthalic-anhydride-forming oxidation catalyst at an oxidation temperature between 400° C. and 600° C. whereupon the hydrocarbon is oxidized to phthalic anhydride and heat generated by the oxidation is accumulated as sensible heat by said mass, and periodically reversing the flow of said mixture, whereby the accumulated heat of reaction in the portions of said mass heated by said oxidation is transferred to mixture below oxidation temperature thus lowering the temperature of said portions of the mass and raising the temperature of the mixture to the oxidation temperature, and limiting the length of each period so that the total heat evolved therein is not more than 20 times the thermal capacity of the catalyst zone expressed as calories per degree C.

8. In the manufacture of a dicarboxylic anhydride by the vapor phase catalytic oxidation of hydrocarbons and lower oxidation products thereof, the improvement which comprises passing a mixture of vapor of the compound to be oxidized and an oxygen-containing gas at a temperature below oxidation temperature through a reaction zone in a mass of solid material comprising a dicarboxylic-anhydride-forming oxidation catalyst at oxidation temperature in which reaction zone said compound is oxidized and heat generated by the oxidation is accumulated as sensible heat by said mass, periodically reversing the direction of flow of said mixture through said reaction zone, whereby the accumulated heat of reaction in the portions of said mass heated by said oxidation is transferred to mixture below oxidation temperature thus lowering the temperature of said portions of the mass and raising the temperature of the mixture to the oxidation temperature, removing reaction products from the oxygen-containing tail gas, passing tail gas through an oxygen analyzer to determine its oxygen content and regulating the reaction to maintain a substantially constant predetermined oxygen concentration between 4% and 10% by volume in said tail gas.

9. The method of making maleic anhydride by vapor phase oxidation of a hydrocarbon containing less than 10 but not less than 4 carbon atoms per molecule, which comprises passing a mixture comprising between 10 and 90 mol percent of said hydrocarbon vapor and between 7 and 30 mol percent of oxygen at a temperature below oxidation temperature through a catalytic zone in a mass of solid material comprising a maleic-anhydride-forming oxidation catalyst at an oxidation temperature between 400° C. and 600° C. whereupon a portion of the hydrocarbon is oxidized to maleic anhydride and heat generated by the oxidation is accumulated as sensible heat by said mass, periodically reversing the direction of flow of said mixture through said zone, whereby the accumulated heat of reaction in the portions of said mass heated by said oxidation is transferred to mixture below oxidation temperature thus lowering the temperature of said portions of the mass and raising the temperature of the mixture to the oxidation temperature, and limiting the length of each period so that the total heat evolved therein is not more than 20 times the thermal capacity of the catalyst zone expressed as calories per degree C., removing reaction products from the oxygen-containing tail gas, passing part of the tail gas through an oxygen analyzer to determine its oxygen content, and regulating the reaction to maintain a substantially constant predetermined oxygen concentration between 4% and 10% by volume in said tail gas.

10. The method of making phthalic anhydride by vapor phase oxidation of a hydrocarbon containing at least 10 but less than 15 carbon atoms per molecule, which comprises passing a mixture comprising between 0.4 and 1 mol percent of said hydrocarbon vapor and between 7 and 30 mol percent of oxygen at a temperature below oxidation temperature through a catalytic zone in a mass of solid material comprising a phthalic-anhydride-forming oxidation catalyst at an oxidation temperature between 400° and 600° C. whereupon the hydrocarbon is oxidized to phthalic anhydride and heat generated by the oxidation is accumulated as sensible heat by said mass, periodically reversing the direction of flow of said mixture through said zone, whereby the accumulated heat of reaction in the portions of said mass heated by said oxidation is transferred to mixture below oxidation temperature thus lowering the temperature of said portions of the mass and raising the temperature of the mixture to the oxidation temperature, and limiting the length of each period so that the total heat evolved therein is not more than 20 times the thermal capacity of the catalyst zone expressed as calories per degree C., removing reaction products from the oxygen-containing tail gas, passing part of the tail gas through an oxygen analyzer to determine its oxygen content, and regulating the reaction to maintain a substantially constant predetermined oxygen concentration between 4% and 10% by volume in said tail gas.

11. The method of making maleic anhydride by vapor phase oxidation of a hydrocarbon containing less than 10 but not less than 4 carbon atoms per molecule, which comprises passing a mixture comprising between 10 and 90 mol percent of said hydrocarbon vapor and between 7 and 30 mol percent of oxygen at a temperature below oxidation temperature through a catalytic zone in a mass of solid material comprising a maleic-anhydride-forming oxidation catalyst at an oxidation temperature between 400° and 600° C. whereupon a portion of the hydrocarbon is oxidized to maleic anhydride and heat generated by the oxidation is accumulated as sensible heat by said mass, periodically reversing the direction of flow of said mixture through said zone, whereby the accumulated heat of reaction in the portions of said mass heated by said oxidation is transferred to mixture below oxidation temperature thus lowering the temperature of said portions of the mass and raising the temperature of the mixture to the oxidation temperature, and limiting the length of each period so that the total heat evolved therein is not more than 20 times the thermal capacity of the catalyst zone expressed as calories per degree C., scrubbing maleic anhydride from the reaction mixture at a temperature above the dew point of water, further treating the remaining gases and vapors to separate unreated benzene therefrom, passing part of the tail gas through an oxygen analyzer to determine its oxygen content, and regulating the reaction to maintain a substantially constant predetermined oxygen concentration between 4% and 10% by volume in said tail gas.

12. The method of making maleic anhydride by vapor phase oxidation of a hydrocarbon containing less than 10 but not less than 4 carbon atoms per molecule, which comprises passing a mixture comprising between 10 and 90 mol percent of said hydrocarbon vapor and between 7 and 30 mol percent of oxygen at a temperature below oxidation temperature through a catalytic zone in a mass of solid material comprising a maleic-anhydride-forming oxidation catalyst at an oxidation temperature between 400° C. and 600° C. whereupon a portion of the hydrocarbon is oxidized to maleic anhydride and heat generated by the oxidation is accumulated as sensible heat by said mass, periodically reversing the direction of flow of said mixture through said zone, whereby the accumulated heat of reaction in the portions of said mass heated by said oxidation is transferred to mixture below oxidation temperature thus lowering the temperature of said portions of the mass and raising the temperature of the mixture to the oxidation temperature, limiting the length of each period so that the total heat evolved therein is not more than 20 times the thermal capacity of the catalyst zone expressed as calories per degree C., and during each period preheating the mixture of hydrocarbon and oxygen to a final preheat temperature which is below oxidation temperature and which gradually diminishes during each period.

13. The method of making phthalic anhydride by vapor phase oxidation of a hydrocarbon containing at least 10 but less than 15 carbon atoms per molecule, which comprises passing a mixture comprising between 0.4 and 1 mol percent of said hydrocarbon vapor and between 7 and 30 mol percent of oxygen at a temperature below oxidation temperature through a catalytic zone in a mass of solid material comprising a phthalic-anhydride-forming oxidation catalyst at an oxidation temperature between 400° C. and 600° C. whereupon the hydrocarbon is oxidized to phthalicanhydride and heat generated by the oxidation is accumulated as sensible heat by said mass, periodically reversing the direction of flow of said mixture through said zone, whereby the accumulated heat of reaction in the portions of said mass heated by said oxidation is transferred to mixture below oxidation temperature thus lowering the temperature of said portions of the mass and raising the temperature of the mixture to the oxidation temperature, limiting the length of each period so that the total heat evolved therein is not more than 20 times the thermal capacity of the catalyst zone expressed as calories per degree C., and during each period preheating the mixture of hydrocarbon and oxygen to a final preheat temperature which is below oxidation temperature and which gradually diminishes during each period.

14. The method of making maleic anhydride which comprises passing a mixture of benzene and air in a mol ratio of about 1:1 through a catalytic zone comprising elongated passages formed by walls of heat cumulative material coated with a maleic-anhydride-forming catalyst at an oxidation temperature between 400° C. and 600° C. whereupon a portion of the benzene is oxidized and heat generated by the oxidation is accumulated as sensible heat by said heat cumulative material, regulating the reaction to maintain a substantially constant predetermined oxygen concentration between 4% and 10% in the spent tail gas, periodically reversing the flow of said mixture, whereby the accumulated heat of reaction in the portions of said material heated by said oxidation is transferred to mixture below oxidation temperature thus lowering the temperature of said portions of the material and raising the temperature of the mixture to the oxidation temperature, limiting the length of each period so that the total heat evolved therein is not more than 20 times the thermal capacity of the catalyst zone expressed as calories per degree C., and during each period preheating the mixture of benzene and air to a final preheat temperature which is below oxidation temperature and which gradually diminishes during each period.

FRANK PORTER.

REFERENCES CITED

The following references are of record in the file of this patent:

UNITED STATES PATENTS

| Number | Name | Date |
| --- | --- | --- |
| 1,817,726 | Vinther | Aug. 4, 1931 |
| 2,215,498 | Fazel | Sept. 24, 1940 |
| 2,013,727 | Douglas et al. | Sept. 10, 1935 |
| 2,230,467 | Neely | Feb. 4, 1941 |
| 2,098,148 | Jarl | Nov. 2, 1937 |